United States Patent
Seelig et al.

(10) Patent No.: US 7,227,929 B2
(45) Date of Patent: Jun. 5, 2007

(54) TELECOMMUNICATION SYSTEM USING MESSAGE PRESENTATION DURING A RINGING SIGNAL PERIOD

(75) Inventors: Karl Seelig, Newport Beach, CA (US); Anita Erickson, Newport Beach, CA (US)

(73) Assignee: Promutel, Newport Beach, CA (US)

( * ) Notice: Subject to any disclaimer, the term of this patent is extended or adjusted under 35 U.S.C. 154(b) by 712 days.

(21) Appl. No.: 10/121,626

(22) Filed: Apr. 11, 2002

(65) Prior Publication Data

US 2003/0086558 A1 May 8, 2003

Related U.S. Application Data

(60) Provisional application No. 60/283,796, filed on Apr. 12, 2001.

(51) Int. Cl.
    *H04M 1/64* (2006.01)
(52) U.S. Cl. ............. 379/67.1; 379/76; 379/88.12; 379/88.25; 379/93.12; 379/114.13
(58) Field of Classification Search ........... 379/88.2, 379/88.22, 88.27, 100.06, 257, 67.1, 76, 379/88.12, 88.25, 93.12, 114.13; 455/412.1, 455/412.2
See application file for complete search history.

(56) References Cited

U.S. PATENT DOCUMENTS

| | | | | |
|---|---|---|---|---|
| 5,321,740 A | * | 6/1994 | Gregorek et al. | 379/88.22 |
| 5,852,775 A | * | 12/1998 | Hidary | 455/412.1 |
| 6,442,244 B1 | * | 8/2002 | Fellingham et al. | 379/114.13 |
| 2003/0002657 A1 | * | 1/2003 | Seelig et al. | 379/373.01 |

* cited by examiner

*Primary Examiner*—Jefferey Harold
(74) *Attorney, Agent, or Firm*—Robert J. Schaap

(57) ABSTRACT

Marketing of goods and services on telephone lines and during a period from the commencement of a telephone call to the receipt and acceptance of that call (quiescent period) when the recipient of the call actuates his or her telephone. This quiescent period of time, during which a ringing signal is normally generated, is used for presentation of advertising or promotional messages, primarily to a caller, although it can be delivered to the recipient of the call, or both. In addition, the system provides for the use of messages during the normal ringing cycle time to effectively replace the ringing signal. The particular advertising or promotional message can be selected for a certain area, such as an area covered by a telephone switchboard or a certain party or characteristics of that party. In this way each individual telephone switchboard is capable of presenting a message different from the next telephone switchboard.

18 Claims, 2 Drawing Sheets

TELECOMMUNICATION SYSTEM USING MESSAGE PRESENTATION DURING A RINGING SIGNAL PERIOD

RELATED APPLICATION

This application is based on subject matter presented in and claims priority from a provisional patent application Ser. No. 60/283,796, filed Apr. 12, 2001, for a Telecommunications System.

BACKGROUND OF THE INVENTION

1. Field of the Invention

This invention relates in general to certain new and useful improvements in telecommunication systems, and more particularly to telecommunication systems which rely upon use of promotional or advertising message presentation or other message presentation during a normal ringing cycle.

2. Brief Description of Related Art

In most telephone systems throughout the world, initiation of a telephone call is achieved by a caller generating a dial tone at his or telephone and that dial tone or voltage is then used and/or received by a telephone switching station, which selects the telephone corresponding to a dialed or inserted telephone number. Thus, if a caller dials the telephone number 12345, the switching station automatically sends that telephone call to the telephone having the telephone number 12345. At that point in time, a ringing signal is generated, which is a signal other than a voice communication signal, and is effectively initiated by the telephone switching station.

The ringing signal causes the telephone at a particular location to generate a telephone advisory message which is usually audible (or visual in the case of telephones for the hearing impaired), so that the recipient knows that a caller is waiting to communicate with the recipient. The vast majority of telecommunication systems which are presently in operation, and particularly public and private telephone systems, use some type of ringing signal to inform a receiver or recipient of an intended message that a caller is attempting to access the recipient of the telephone call. Thus, if a telephone communication is initiated to a particular residence, the telephone in that residence will generate a ringing signal advising the occupants of the intended call. When the recipient picks up the telephone handset or effectively unhooks the telephone, a message path is completed.

Although a ringing signal is generated at the residence or other location to which the telephone call is directed, a similar ringing signal, referred to as a "ring-back" signal, is generated also in the telephone of the caller. This is accomplished again, through a telephone switching station associated with that caller, so that the caller may hear a ringing signal and recognize that the telephone of the intended recipient is also ringing.

There is, by telephone design, a delay which arises between the completion of a dialing process and the initiation of a first ring of a ringing sequence. Although that time period may be short, perhaps no more than four to six seconds, depending upon the particular telephone system, that time is merely a wasted time period in which the caller must await an initiation of a ringing signal. However, most callers immediately become accustomed to the fact that there is a time delay, and hence this time delay is expected with little or no consideration being given to that delay. In addition to the foregoing, most telephone systems also use a quiescent time period between each of the ringing signals in a ringing signal sequence. Thus, a fair interval of time exists between the initiation of a telephone call and the actual time that a recipient answers that telephone call by unhooking or activating his or her telephone system.

It would be possible to use this entire ringing cycle for presentation of an advertising or promotional message. It is also possible to deliver this message to the calling party. Delivery of a message to a calling party is particularly advantageous for an organization which is called and which wishes to promote its products or services via telephone advertising or promotion. In this way, a substantially longer advertising or promotional message could be generated for hearing by a party attempting to contact a particular organization. However, if desired, it is also possible to direct that message to the recipient of the telephone call, or otherwise to both parties. The generation of a message, and particularly a message in the nature of an advertising or promotional message, can be quite advantageous for a consumer of a given product or service in that product information could actually be given during this time period. The use of this advertising or promotion, via the telephone communication link, is highly advantageous in that it can result in lower cost telephone service for the consumer attempting to initiate a contact with a certain business organization. Consequently, it is believed that the telephone communication system of the invention is highly effective for organizations which frequently receive telephone communications about the products or services. Thus, in each case, the caller would listen to an advertising or promotional message about the product or service offered by the organization that the caller was intending to contact.

The concept of applying an advertising or promotional message to a telephone communication link has been proposed in U.S. Pat. No. 4,811,382 dated Mar. 7, 1989, to Neal Sleevi. The Sleevi patent, however, is specifically limited to a land based or so-called hard-wired network and does not include more modern forms of telecommunication which have become available since the time of the Sleevi patent. Moreover, Sleevi did not envision the selective selec-1Xtion of messages depending upon a particular caller and which selected message was designed to conform to or meet the purchasing information or other criteria of a particular customer. Thus, Sleevi was deficient in this regard, as well as in other areas.

U.S. patent application Publication No. US 2001/0051517 A1, published on Dec. 13, 2001, to Jonathan Streitzel identifies a telecommunications advertising system in which advertising or promotional data is not limited only to a land based system, but also includes a wireless or cellular communication system. However, the Streitzel publication based on U.S. patent application Ser. No. 09/753,415, filed Jan. 2, 2001, similarly suffers a number of disadvantages. Although Streitzel does provide for advertising and promotional messages used in a cellular communication, it does so with several limitations not necessarily overcome by the Sleevi patent.

There are also several commercially operating telephone companies forming part of the Bell system, which generate messages before the ringing signal. Thus, for example, the telephone organization may offer a message to the effect that this telephone call is brought by "Coastal Bell". However, that message is generated with the use of a time delay before the actual ringing signal is initiated. In effect, it does not replace any or a portion of the ring-back signal, or for that matter, the ringing signal.

It would therefore be desirable to provide a telecommunication system in which an advertising or promotional message could be generated over a telephone communication link and delivered in the time between or in place of a ringing signal sequence.

OBJECTS OF THE INVENTION

It is, therefore, one of the primary objects of the present invention to provide a telecommunication system in which advertising or promotional messages can be generated over a telephone link during a quiescent period which occurs during a ringing signal sequence.

It is another object of the present invention to provide a telecommunication system of the type stated in which advertising or promotional messages can be either overlaid upon or substituted for a portion of or all of a ringing signal (including ring-back signal) sequence.

It is a further object of the present invention to provide a telephone system in which advertising or promotional messages can be selected and generated to a particular caller or even to a particular recipient of a call based on stored information regarding the caller or the recipient of that call.

It is an additional object of the present invention to provide a telephone system of the type stated in which advertising and promotion can be used to offset the cost of telephone communications, and in which a caller can obtain information about a product or service of interest.

It is also an object of the present invention to provide a telephone system of the type stated in which the use of advertising and promotional messages for generation over the telephone line can be instituted at a relatively low cost and with the use of commercially available message generating equipment.

It is another salient object of the present invention to provide a method of generating advertising or promotional messages over a telephone communication link during a ringing signal sequence and which can be used in place of or overlaid upon a portion of or all of the ringing signal.

It is still a further object of the present invention to provide a method of targeting advertising or promotional messages to a caller in a telephone communication link or to a recipient of that call, which are selected based on stored information regarding the recipient of the call or the caller or both.

With the above and other objects in view, our invention resides in the novel features of form, construction, arrangement and combination of parts and components presently described and pointed out in the claims.

BRIEF SUMMARY OF THE INVENTION

The present invention primarily relates to a telecommunication system which is adapted to present sound presentatons, e.g. messages during the time interval between the initiation of the telephone dialing process and the time period when the telephone of the recipient is first answered, frequently referred to as being "unhooked". In this case, this time period is referred to herein as the "quiescent period". More specifically, the invention provides a telecommunication system capable of providing marketing of goods and services over a telephone communication link by the presentation of promotional and advertising messages during this quiescent period. Actually, the message could be generated between the completion of the telephone dialing signal and the beginning of the first ringing signal. However, the message could be used during the entire time interval between the initiation of the telephone dialing process and the answering of the telephone by the intended recipient.

In accordance with the above system, advertising or promotional messages will fill the mute space between the completion of the dialing process, whether by a touch tone generator or by a voltage signal dialer, and the completion of the answering of the recipient telephone. If desired, it is even possible to delay the initiation of the ringing signal or even completely eliminate that ringing signal and substitute therefor It is recognized that the public in general is accustomed to hearing a telephone ringing signal, both by the intended recipient and a ring-back signal through the telephone link by the person initiating the telephone call. Thus, and in this way, the caller recognizes that the telephone of the intended recipient is ringing to apprise the recipient of a potential phone call. The ring-back signal is an audible signal effect which may be computer generated, an dis the result of the non-audible "out-of-band" signal transmitted on the SS7 line. However, since the effect of the ring-back signal is almost inevitably heard by the caller when a ringing signal is generated at the location of the intended recipient, the term "ringing signal", as used herein, will often be deemed to include a "ring-back" signal.

Notwithstanding the foregoing, by replacing all or a portion of the ringing signal and the ring-back signal, the public will quickly realize and become accustomed to the fact that a ring-back signal is substituted by a message in accordance with the invention and particularly, an advertising or promotional message. Indeed, it is recognized that telephone communication systems throughout the world, no matter how rudimentary or archaic, employ a telephone ringing signal for apprising the intended recipient of the telephone call and of a ring-back signal which is generated for the phone caller to hear. Nevertheless, the benefits of a message, as opposed to listening to a ring-back signal to the caller, or even a ringing signal to a recipient, can be quickly appreciated.

It is recognized that many telephone users may initially object to being forced to listen to an advertisement or promotional message, or for that matter, any other type of message. Nevertheless, the fact remains that the sellers of goods or services who offer the telephone messages during this periods can generate substantial revenues and which can be translated into substantially lower telephone costs. As a result, the purchasing public may welcome the use of these messages after a short period of time.

It is envisioned that a recipient organization, that is, one which receives a telephone call, may even offer some type of product or service discount to a caller or even to issue credits to a caller for listening to an advertising or promotional message. In many cases, the advertising or promotional message may be welcomed, since it is a source of information to the purchaser or intended purchaser about the goods or services offered by that recipient organization.

The present invention is arranged so that the caller initiating the telephone call will hear a message regarding the products or services of the intended recipient. However, as indicated above, the present invention provides for generation of the message to the caller or the party receiving the telephone call, if desired, or both. However, in large measure the message will be linked to the location of the telephone caller, so that the message is generated only to the caller.

The invention is effective, in that organizations, both large and small, can profit not only from the publicity about their goods or services, they can also profit by customer interest and potential customer interest through giving the customer a choice to be directly connected to an in-house operator.

Smaller companies with a tighter budget for publicity can also rely upon transmitting messages with a more limited target market.

As an auxiliary advantage of the present invention, the organization which desires to incorporate an advertising or promotional message in place of all or portions of the ring-back, or even overlaying the message on the ring-back signal, of the telephone caller can quickly gather experience in how to provide targeted advertising or promotional messages. Thus, for example, this organization can determine where and how much money would have to be expended in order to obtain a desired result from its publicity. Further, company data generated about buying patterns and customer information could be quite valuable to any company attempting to target a particular marketing promotional message.

In a normal telephone communication system, a caller initiating a telephone call will initially generate a signal indicative of a call in process. The signal is transmitted to the central switching station of the telephone recipient, and that central switching station of the telephone recipient then generates the ringing signal so that the telephone recipient will recognize the presence of an awaiting telephone call. The second switching station transmits an out-of-band signal, as previously mentioned, on the SS7 line advising the first telephone switching station to generate a ring-back signal to the caller. The first switching station will thereupon generate that ring-back signal.

The system of the present invention utilizes that conventional switching arrangement and ringing signal and ring-back signal generation system. However, the system of the present invention can be broadly described as a telephone located at a first location, such as a telephone caller's location. A signal is generated to a central switching office associated with that telephone caller's location. The call in process and message or data signal is then connected to an antenna or similar transmitter via a satellite to a receiving station. The signal at the receiving station is then sent to a second central switching office. Alternatively, the message received at the first central switching office from the initiating telephone call location can be transmitted terrestrially with the use of a transmitting antenna in combination with a receiving antenna located in proximity to the second central switching office.

A messaging device is connected to the second central switching office and a similar messaging device is connected to the first central switching office. The message to be delivered to the telephone caller is actually generated by the messaging device associated with the first central office switching station, although it could be generated at the second switching station, if preferred. Moreover, the telephone call from the caller is then sent to a telephone at a second location, such as a receiving location. The second central switching office generates a ringing signal for that second location, and also generates the out-of-band signal to cause generation of the ring-back signal. The second station, however, sends the data message to that first location, via the first switching station. However, this arrangement can be altered, if desired, so that the message generation could occur at the first switching station or the like.

In the meantime, in place of, or in addition to, the ringing signal, the first central switching office will cause a message, such as an advertising or promotional message from the second messaging device to be delivered, back through the telecommunication link, to the first central switching office and back to the telephone caller, as aforesaid. Thus, and in this way, the caller at the first location will hear the promotional or advertising message.

The present invention also provides a telephone communication system similar to that previously described, except with cellular telephones. Thus, and in this case, the party initiating the telephone call may be using a cellular telephone system, or otherwise, the recipient party receiving the call may be operating with a cellular telephone system. In like manner, a caller using a hard-wired telephone could also access a receiving party using a cellular telephone. A messaging device similar to that previously described would form part of or would be associated with the telephone switching stations and the remainder of the system would be similar to that previously described.

In connection with the use of cellular telephones, each telephone would have a transmitting antenna and the cellular telephone message would be received at a receiving antenna. The signal from that receiving antenna would thereupon be directed to or received from the associated central switching office for that cellular telephone.

The use of the system of the present invention is related closely with the life cycle of a telephone. The pressures resulting from Internet communication and video conferencing will, to some extent, determine the life of the system of the present invention. However, it is believed that future innovations in the area of telemarketing and, for that matter, even in the field of Internet communication and video conferencing, will only enhance the system of the present invention.

This invention possesses many other advantages and has other purposes which may be more clearly apparent from a consideration of the forms in which it is embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
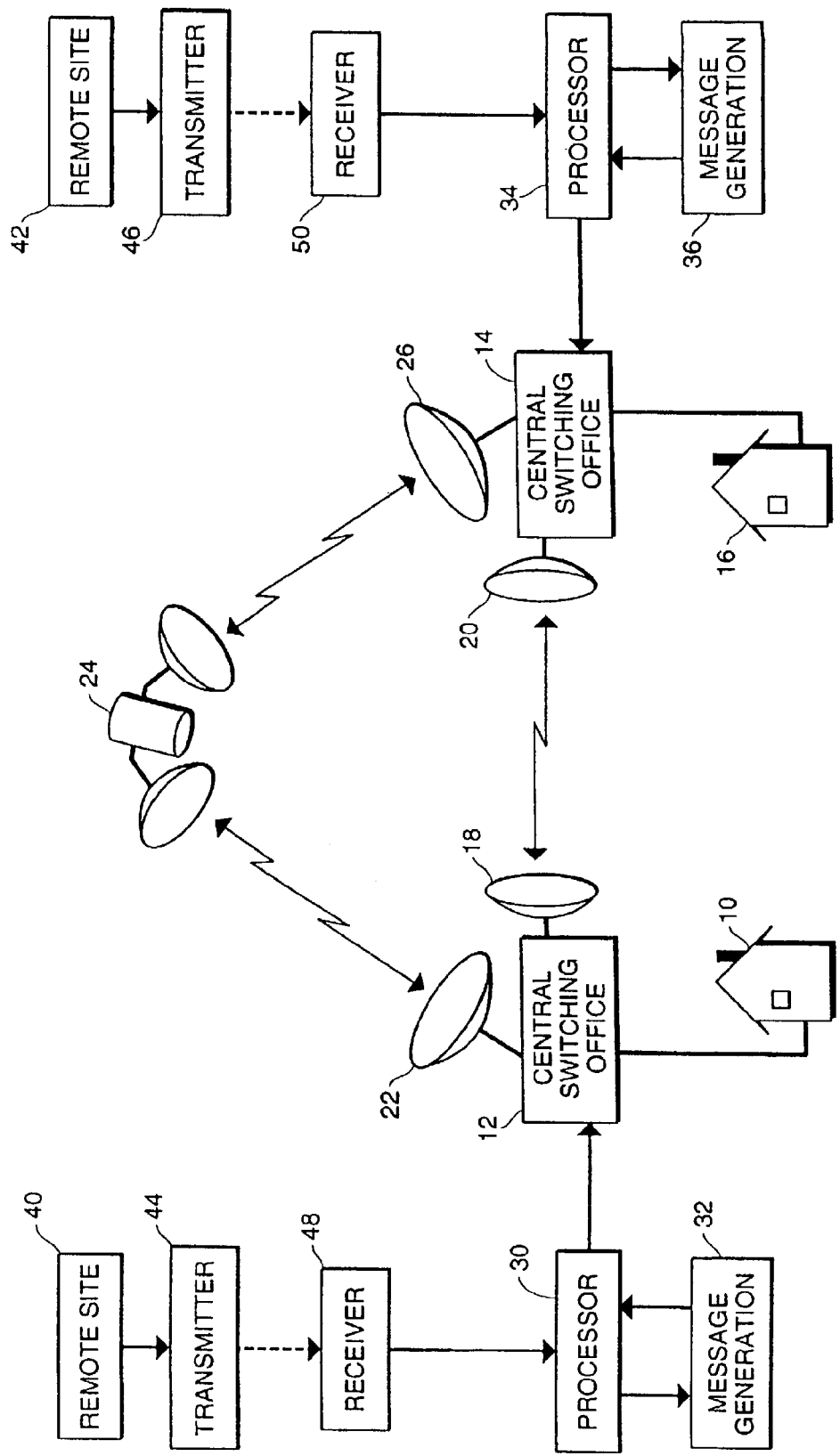
Figure 2:
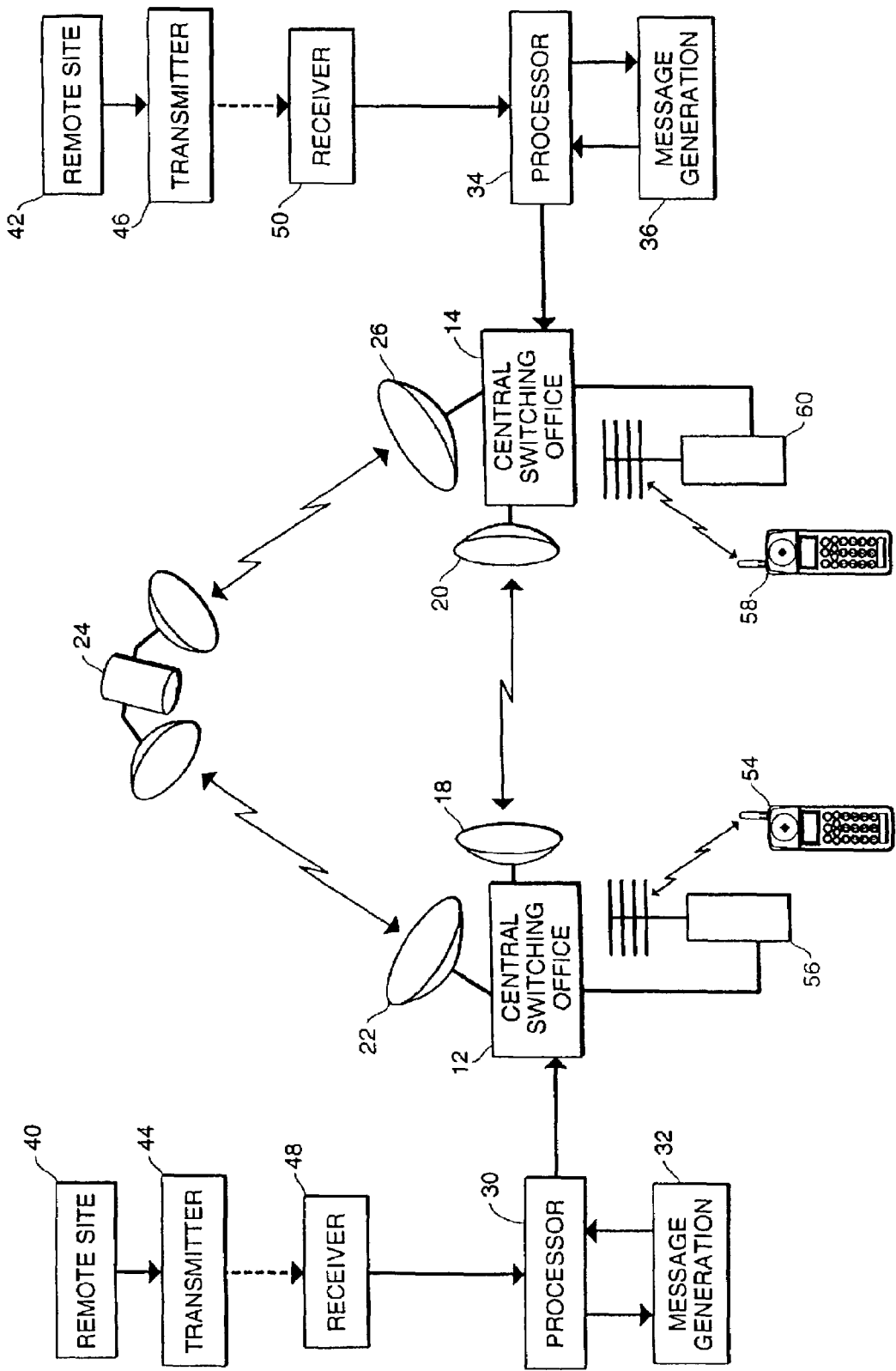

Having thus described the invention in general terms, reference will now be made to the accompanying drawings in which:

FIG. 1 is a schematic illustration of one telecommunication system in accordance with the present invention; and FIG. 2 is a schematic view showing a modified form of the telecommunication system in accordance with the present invention.

DETAILED DESCRIPTION OF PREFERRED EMBODIMENTS

Referring now in more detail and by reference characters to the drawings, FIG. 1 illustrates a telecommunication system which allows for introduction of a message such as an advertising or promotional message over a telephone communication link. In this respect, the basic conventional telephone switching system is employed with the present invention, only modifying that system for purposes of introducing a message for delivery to the caller or the receiving party or both.

Referring in particular to FIG. 1, there is provided a first location 10, as for example, a residential location from which a telephone call can be initiated. Any telephone call from this first location 10 would be delivered directly to a central switching office or so-called "switchboard" 12, which services the area for that first telephone. In this case, the central switching office could adopt a telex office, a PBX unit, or the like. Notwithstanding, the central switching office 12 then causes that message to be delivered to another central switching office 14 for ultimate delivery to the intended recipient at a second location 16.

The delivery of a telephone call from one central switching station to another usually can take place by any conventional means, as for example, by hard wired delivery. However, in many conventional practices, the telephone call is communicated terrestrially by means of a transmitting antenna 18 associated with the first central switching station or office to a receiving antenna 20, associated with the second central switching office 14.

Alternatively, transmission from the first central switching station 12 to the second switching station 14 can occur terrestrially through a transmitting antenna 22 to a satellite 24, and which is then received on a receiving antenna 26 associated with the second central switching station. The exact means for delivery of a signal from the first central switching station to the second central switching station 14, or from the second central switching station 14 to the first central switching station 12, is conventional and not critical to the present invention.

In effect, it should be noted that the telephone communication system thus far described is essentially symmetrical in that the central switching station 14 can actually be the transmitting central switching station for a telephone call initiated from the second location 16, and the first central switching station 12 would be the receiving central switching station for delivery of that telephone call to a party at the location 10.

In accordance with conventional practice, if a telephone call is initiated from the first location 10 and directed to the first central switching station 12 and then transmitted to the second central switching station 14, it is that second central switching station which initiates and sends the ringing signal to the location which receives that telephone call, namely, the second location 10. In like manner, the first central switching station 14 also generates and transmits a ring-back signal to the first or calling location 16. Again, in order to achieve the symmetry of the switching system, if the second location 16 initiated the telephone call to be received at the first location 10, the first central switching station 12 would initiate the ringing signal to be heard at the first location 12 and potentially a ringing signal to be heard at the second location 16.

Delivery of a message to the first location may be accomplished by a processor 30 and associated message generator 32 connected to the first central switching station 12. Alternatively, a message to be heard at either location can also be generated through a processor 34 and an associated message generator 36, all as best shown in FIG. 1 of the drawings. Either processor and the associated message generator is capable of introducing a message and particularly, an advertising or promotional message, to the first location 10 or to the second location 16, or both.

It should be recognized that the central office 12, or for that matter the central office 14, may well be provided with a processor or a computer. That processor or computer could be used in place of the separate processor 30 and the separate processor 34. However, for convenience and in order to avoid a reprogramming of the processor at either switching station, separate processors 30 and 34 may be employed. The message generators 32 and 36 could be relatively simple circuits which cause generation of a pre-programmed or recorded message in response to a signal from the associated processor 30 or 34, respectively, or otherwise from the processor forming part of the central switching station. Generation of the message can be accomplished in a manner as hereinafter described in more detail.

Reprogramming for changing or adding or deleting a message at the message generator 36 can be accomplished from a remote site 40 or 42. For this purpose, a transmitter 44 is located at or associated with the remote site 40 and a transmitter 46 is located at or associated with the remote site 42. Moreover, a receiver 48 is located at, or in proximity to, the processor 30, and a receiver 50 is located at, or in proximity to, the processor 34. In accordance with this arrangement, messages can be created at either of the remote sites 40 or 42 and transmitted from the associated transmitters 44 or 46, respectively, to the receivers 48 or 50, respectively. In this way, the message at the message generator can be altered, as required.

It should also be understood that appropriate programming at the central office 12 or at the central office 14 could be used to obviate the need for the processor 30 and the message generator 32, as well as the processor 34, and the message generator 36. However, in order to simplify alteration of the conventional telephone system, the use of a separate processor and message generator may be preferred.

It is also to be recognized that a message generated by the message generator 32 could be delivered to the second location 16 or to the first location 10, or to both. The same holds true with a message generated at the second message generator 36.

FIG. 2 illustrates an embodiment of an invention somewhat similar to FIG. 1, but which uses cellular telephone technology. In this case, like components in FIG. 2 will carry the same reference numbers used for the same components in FIG. 1.

In place of a fixed location, as for example, a residence 10, and in place of a fixed location, as for example, a residence 16, the cellular communication system provides a cellular telephone 54 operating with a cellular antenna 56 and the latter of which receives the signal from the cellular telephone and transmits that signal, either via wireless signal or over a conductor so that the same is received at the first central switching office 12. In like manner, a cellular telephone 58 and an associated antenna 60 replaces the fixed telephone at a fixed location 16. In the same manner, the signal from the cellular telephone 58 to the antenna 60 is then delivered directly to the second central switching office 14.

The telephone system shown in FIG. 2 operates in essentially the same manner as the telephone system of FIG. 1. Thus, even with the cellular technology communication system, a message can be introduced in the telephone link so that the message can be heard primarily at the calling cellular telephone 54. It should also be recognized that the message can be sent to the receiving cellular telephone, namely, that telephone 58, or for that matter, both such telephones. Moreover, that message can also be generated through the central switching office 12 or the central switching office 14. However, and in this respect, it should be recognized that the central switching offices 12 and 14 would be those adapted for cellular telephone communication, as opposed to hard wired communication.

It should be recognized that the quiescent period is that period of time which exists between the actual completion of the dialing process and the time when the recipient at a second location answers the telephone at that second location. That time may vary depending upon the delay occasioned by the recipient at the second location. Nevertheless, the time period is still fixed in that it commences at the completion of the dialing process and ends at the time that the recipient at the second location answers the telephone at that second location. The same holds true whether or not the telephone at the second location is answered by a telephone answering machine.

It also should be recognized that a processor is located at the first switching station and a separate processor is located at the second switching station in order to provide a symmetry of construction, so that each switching station operates as a calling or receiving switching station. Moreover, the processor can be operated so as to provide a pre-recorded message to the caller in place of or in addition to the ringing signal, or to the recipient of the phone call, or to both. It is also possible to generate different messages with one intended for the recipient of the phone call and the other intended for the caller. In most cases, and where the system is being used to present advertising and promotional messages, the message will be generated primarily for the caller to hear in place of or in addition to a ringing signal.

The processor at each of the switching stations can also be operated so as to cause a message to be overlaid upon a ringing signal. That is, the ringing signal can be heard with reduced volume, as for example, a background ringing signal with the message also presented therewith. In addition, it is possible to eliminate a portion of the ringing signal and to present the message in the eliminated portion of the ringing signal. Finally, it is also possible to completely eliminate the ringing signal and generate a message during that period. This latter case is electronically the easiest to implement and the one which will be most frequently employed.

The processor is provided with a storage member as for example, a read only memory in which various messages can be stored. Moreover, the memory can be programmed to generate a certain type of stored message depending upon the nature of the calling party, and particularly the geographic location and/or demographics of that calling party. Thus, parties in a particular location, for example, would receive one message whereas parties in another location would receive another message. As a simple example, someone located in a mountain area where temperatures are cooler would receive one message about warm clothing articles, and a party located in a desert area where temperatures are significantly higher would receive a different message about promoting cooler clothing articles. In this case, the processor would be programmed to discriminate among the area codes of the calling party so as to select the proper message for delivery to that calling party.

It is also possible to enable the processor to cause generation of a standard message to be generated for each of the callers, such as, for example, whether the caller is interested in purchasing a new product, returning a purchased product, seeking information on a product, etc. In this way, the calling party can introduce a signal, such as a touch tone signal, to select the type of message appropriate to that caller. Thus, if the caller actuates a particular push button switch on a tone generator, the processor would cause a certain message associated with that push button switch to be generated to the calling party or so-called "caller".

The messages, which are to be generated from the message generator, can be changed periodically to reflect current conditions, different selling techniques, different products or the like. Moreover, the messages can be changed from a remote source using telephone links with the processor or the memory of that processor. Thus, for example, a party located in a remote office can dial a selected telephone number and reprogram the processor to cause generation of a different message.

Although the processor has been shown apart from the associated switching station, it should be recognized that the processor could be incorporated in and form a part of that switching station, or for that matter, the message generator or both. In like manner, the message generator could also be incorporated in the second switching station. It should also be recognized that it is possible to literally incorporate the message generating system directly in the cellular telephones. Thus, and in this case, when a message is received at the receiving cellular telephone, a message would be generated in place of, or overlaid upon, or in addition to, the ringing signal. Furthermore, that message can be changed from a remote location with wireless signal transmission to the cellular telephone.

One of the advantages of the message generating system of the invention is the fact that any of a plurality of messages can be targeted to specific individuals, and particularly, parties initiating a telephone call. For example, information about a large group of individuals with regard to purchasing habits and the like can be entered into a database. Particularly for cellular telephone users, when that cellular telephone subscriber dials a telephone number, depending upon the time of day, it is possible to direct a message to that particular subscriber. More specifically, if that subscriber frequently attends certain types of restaurants at an evening hour, messages can be generated to that subscriber which might implant suggestions as to a potential restaurant to visit. Based on data obtained about that particular subscriber, such as e.g., credit card purchases, specific messages can be generated and stored on delivery to that customer. Thus, the advertising and promotional benefit which can be achieved would significantly outweigh the availability with other forms of advertisement.

It is also possible to pre-program the processor to perform a variety of functions, in addition to enabling the generation of a message with respect to a ringing signal. Thus, the processor could be arranged to perform automatic functions, such as, initiating a follow-on call if the recipient party was not answering. The processor could also be arranged to allow speaking to one or more departments upon actuation of one or more push button switches on the telephone dialing touch tone pad. Similarly, by actuating another push-button switch, the caller could elect to have a brochure automatically sent to that caller. This process actually saves time for the caller and for the recipient so that it is not necessary to frequently engage in long conversations when certain activities can be achieved through the use of the touch tone telephone pad.

The telecommunication system of the invention could also be adapted to account for money transactions. Thus, credits and debits could be accumulated and stored and transmitted to a processing center based on actions which may be taken as a result of advertising and promotional communications. Thus, for example, if a purchaser should immediately select a particular product or service based on an advertisement which is presented, the financial transaction associated with that purchase can be recorded. This would facilitate the ease of purchase and hence, more readily cause the purchase to take place.

Thus, there has been illustrated and described a unique and novel telecommunication system as well as an apparatus and method of use therefor, which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what we desire to claim and secure by Letters Patent is:

1. A telecommunication system in which a message can be generated and heard by at least one of a caller or a recipient of a telephone call during the quiescent period between initiation of a telephone dialing activity and the answering of a telephone by that recipient, and with a ringing signal heard in the telephone of the recipient and a ringback signal heard in the telephone of the caller, said system comprising:
    (a) a telephone at a first location of a party attempting to initiate a telephone call;
    (b) a first telephone switching station associated with the telephone at the first location;
    (c) a second location containing a telephone of a recipient of the telephone communication;
    (d) a second telephone switching station associated with that second telephone location and receiving a signal from the first switching station regarding the telephone communication and enabling a ringing signal to be generated at the second location; and
    (e) sound presentation generating means associated with at least one of said switching stations for generating a sound presentation for a time period which commences at the completion of a telephone dialing activity by the caller and during the period when a ringing signal would otherwise occur at the second location and a ringback signal would otherwise occur at the first location and which period would continue until the answering of the recipient telephone at the second location, said sound presentation generating means also causing no sound presentations to be generated when the second telephone is off hook thereby enabling the generation of a busy signal at least on the telephone at the first location.

2. The telecommunication system of claim 1 further characterized in that said sound presentation generating means comprises a first sound presentation device which is associated with the first switching station and a similar and second sound presentation device is associated with the second switching station.

3. The telecommunication system of claim 2 further characterized in that the first sound presentation device generates a message at the first switching station for hearing at the telephone at the first location.

4. The telecommunication system of claim 1 further characterized in that an antenna system is associated with the two telephone switching stations to enable transmission of messages from one switching station to the other.

5. The telecommunication system of claim 1 further characterized in that a sound presentation is generated only between the time period in which dialing is completed and the telephone at the second location is answered and where a ringing signal and a ringback signal would otherwise occur.

6. The telecommunication system of claim 1 further characterized in that the quiescent period may be altered so that it is not of a normal time ringing period.

7. The telecommunication system of claim 1 further characterized in that a telephone at least one of said first or second locations is a fixed telephone using a hard wired telephone link.

8. The telecommunication system of claim 1 further characterized in that a telephone at least one of the first or second locations is a cellular telephone using a cellular communication system.

9. The telecommunication system of claim 2 further characterized in that a central processor is operable with at least one of said switching stations and at least one associated sound presentation generating device therefor.

10. An improvement in a telecommunication system of the type having first and second telephone locations remote from one another in which a telephone caller at a first location attempts to access a telephone recipient at the second location along with at least one central switching station effectively between the locations and a telephone communication link therebetween, an improvement comprising:
    (a) switching means associated with at least one central switching station for generating a sound presentation during a time period commencing after dialing and when a portion of or all of a normal ringing signal would be generated at the telephone at the first location and which would replace or overlie the ringback signal, and which switching means would allow for generation of a busy signal at the telephone at the first location if the telephone at the second location is off hook, but preclude generation of a sound presentation during the time the telephone at the second location is off hook.

11. The improvement in the telecommunication system of claim 10, further characterized in that a sound presentation generating device is associated with at least one central switching station for generating a pre-recorded sound presentation for transmission to the telephone of the calling party at the second location.

12. The improvement in the telecommunication system of claim 10 further characterized in that said sound presentation is an advertising or promotional message and which is generated substantially during the entire time period in which a ringing signal would normally be generated at the telephone of the recipient.

13. The improvement in the telecommunication system of claim 10 further characterized in that the sound presentation is generated for a period which is no longer than the normal ringing cycle for the telephone of the caller.

14. The improvement in the telecommunication system of claim 10 further characterized in that a plurality of sound presentations are provided and wherein the central switching station operates in conjunction with a message center in order to select a sound presentation designed for a caller of the type initiating a telephone call to a recipient.

15. A method of generating a sound presentation over a telecommunication link during a portion or all of a normal ringing cycle period between the completion of a dialing process and the time when a telephone of the recipient is answered, said method comprising;
    (a) initiating a telephone communication by introducing a telephone calling code of an intended recipient;
    (b) generating a sound presentation to be provided during a portion of or the entire time that a ringing signal would normally be generated at the telephone of the recipient to be heard by the caller or the recipient or both; and (c) precluding generation of the sound presentation and allowing for normal busy signal to be generated if the telephone of the intended recipient is off hook.

16. The method of claim 15 further characterized in that said method comprises reducing the normal sound of a ringing signal and generating of a sound presentation overlying that ringing signal.

17. The method of claim 15 further characterized in that said method comprises eliminating the ringing signal and generating a sound presentation in place of the ringing signal.

18. The method of claim 15 further characterized in that said method comprises generating the sound presentation during a portion of or all of the normal quiescent period of time in which a ringing signal would be generated.

* * * * *